A. MAASSEN.
SUGAR SEPARATOR.
APPLICATION FILED SEPT. 28, 1908.
934,000.
Patented Sept. 14, 1909.
2 SHEETS—SHEET 1.
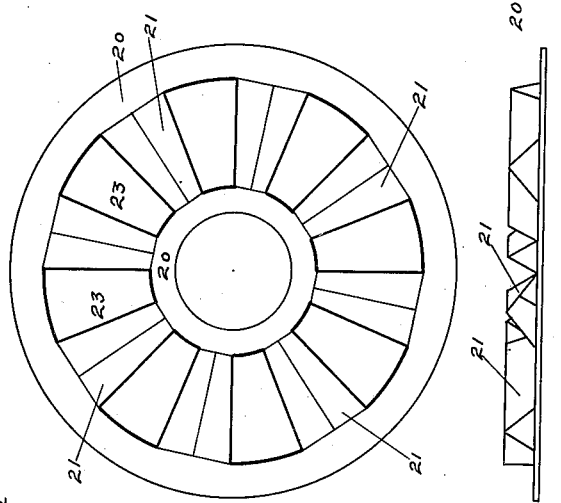
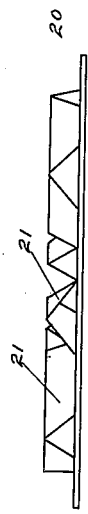
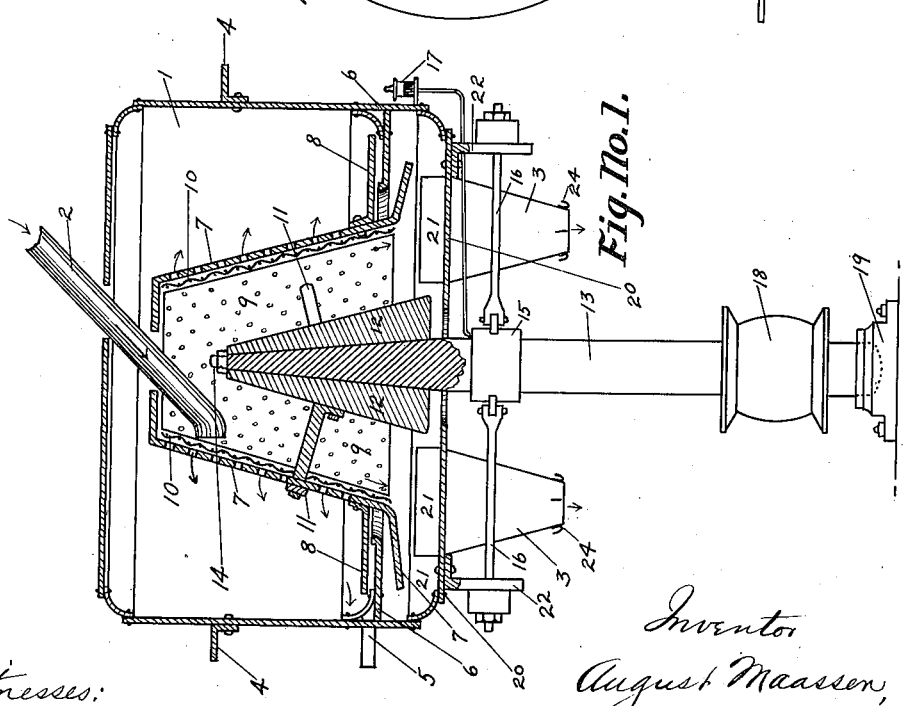

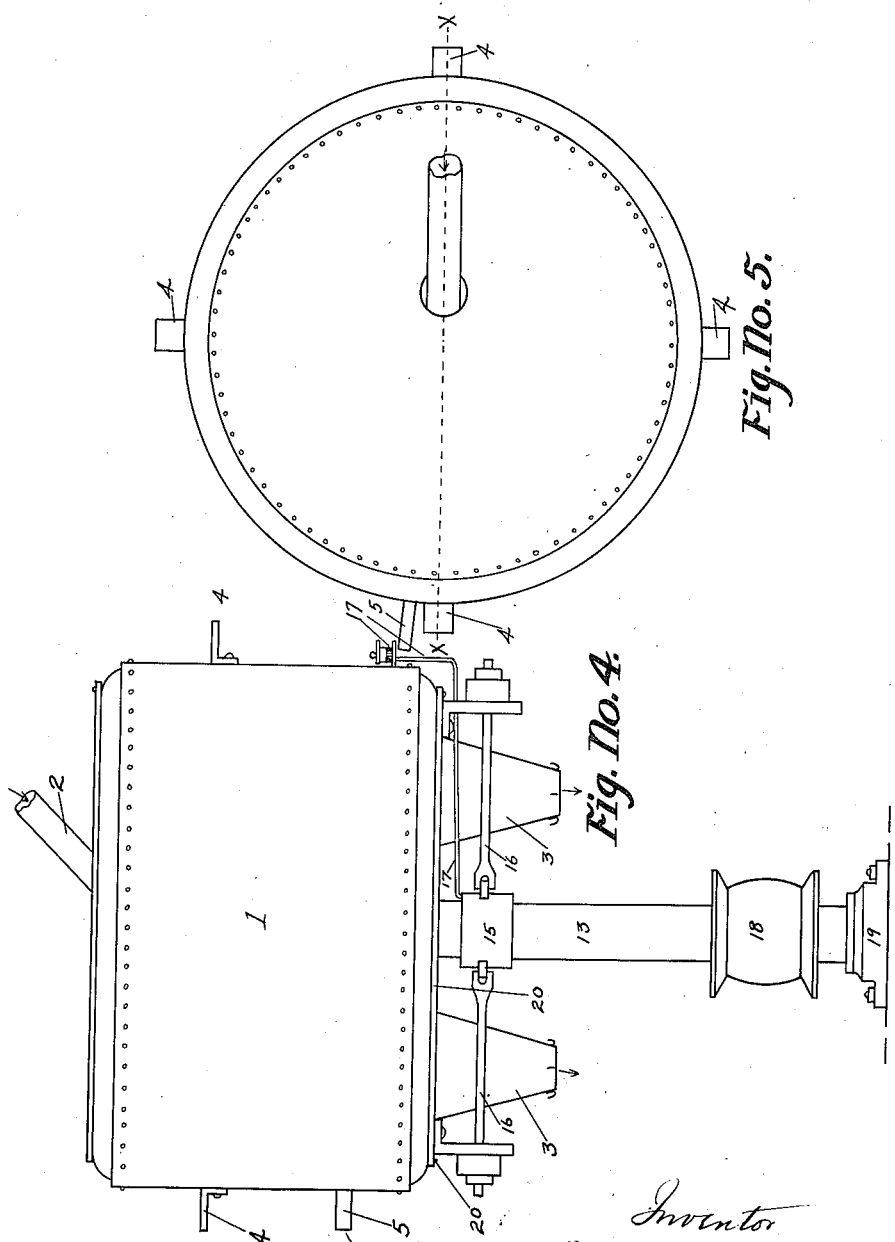

UNITED STATES PATENT OFFICE.

AUGUST MAASSEN, OF SALT LAKE CITY, UTAH.

SUGAR-SEPARATOR.

934,000.  Specification of Letters Patent.  Patented Sept. 14, 1909.

Application filed September 28, 1908. Serial No. 455,203.

*To all whom it may concern:*

Be it known that I, AUGUST MAASSEN, a citizen of the United States, residing at Salt Lake City, in the county of Salt Lake and State of Utah, have invented certain new and useful Improvements in Sugar-Separators, of which the following is a specification.

The object of my invention is to provide a device for separating the sugar crystals from syrup, and especially to extract the sugar from the syrup from beets, and to provide a separator that can be run continuously. As the syrup is separated from the sugar, the latter will fall of its own weight into sacks that are suspended beneath the separator. These objects I attain by the invention illustrated in the accompanying drawings, in which similar figures of reference indicate like parts throughout the several views.

Figure 1 is an elevation of my invention, partly in section on line $x, x$, of Fig. 5. Fig. 2 is a plan view of the bottom. Fig. 3 is an elevation of said bottom. Fig. 4 is an outside elevation of my invention. Fig. 5 is a plan view of the top.

My device consists of an outer casing 1, preferably cylindrical in form and constructed of any strong material, such as boiler steel or other strong metal, and has an opening in the top, within which is inserted the inlet fluid pipe 2. Secured to the bottom 20, of this outer casing are discharge chutes 3; and secured to the sides of the said casing 1, are the stay braces 4, for rigidly securing the machine in position. Provided in the side and near the bottom of said outer casing 1, is a discharge syrup pipe 5. Within this outer casing 1, is securely fitted an open annular diaphragm 6. To the bottom of said outer casing is securely fastened stay brackets 22, through which, and adjusted by threaded nuts, are the stays 16. These stays are pivoted to a bearing 15, within which is operated the vertical shaft 13. Said shaft carries pulley 18, and is also provided with a bottom bearing 19. On the upper portion of said shaft, that is formed in a conical shape, is secured (by a nut 14) the conical hub 12, on which, by means of the stay rods 11, is rigidly secured a perforated frusto-conical inner casing 7. On the outer side of said casing 7 and near the bottom, is provided and secured the syrup shelf or drain board 8. Within this inner casing 7, similar in shape but smaller in size, is secured a sieve 9, made of any suitable material, preferably brass. Between this sieve 9, and the said inner casing 7, is fitted the screen 10, made preferably of wire of about one eighth of an inch diameter. Oil cup 17, and pipes leading therefrom to the bearings are provided. On the upper side of the bottom 20, of the outer casing 1 is provided inverted V shaped partitions 21. The purpose being to form chutes; by said partitions, that will direct the sugar as it falls, through the openings 23, in said bottom. Beneath said openings 23 are secured the chutes 3. Figs. 2 and 3 show the position of these partitions.

Power being applied to the shaft by a belt operating upon pulley 18, the inner casing 7, and the parts secured thereto are made to revolve very rapidly, preferably from 1000 to 1200 revolutions per minute. The strained syrup carrying the saccharine particles, having been previously treated by heat and chemicals, is then allowed to flow through pipe 2 into the separator.

The pipe 2 discharges its contents, so that the syrup strikes the lining or sieve 9, of the frusto-conical casing 7. The centrifugal force of the said casing 7, draws the syrup through the sieve 9, the screen 10 and through the perforations provided in the casing 7, and it flows down the outer side thereof. And as directed by the rapidly revolving syrup shelf or drain board 8, the syrup is drawn off through discharge pipe 5. The open diaphragm 6, situated below said drain board 8, has the inner edge bent upward; this prevents any flow of the syrup except through this discharge opening 5. The centrifugal force as applied to the sugar, dries it of its syrup and moisture so that only the sugar crystals are retained within the inner casing 7. The centrifugal force and gravity cause the saccharine crystals or sugar to fall. The partitions 21, forming chutes, direct the falling particles through the openings 23, in the bottom of my device, into the chutes 3. And provided on the lower extremities of said chutes 3 are hooks 24 on which sacks may be suspended to catch the sugar.

Having thus described my device I desire to secure by Letters Patent.

1. The combination of a power driven vertical shaft, a bottom and a guide bearing therefor, a perforated bell shaped casing secured on the upper portion thereof, with an outer cylindrically shaped casing, an open annular diaphragm within said outer casing and a bottom for said outer casing with inverted V shaped partitions superimposed thereon, and open spaces therebetween.

2. The combination of a power driven vertical shaft, a guide bearing therefor, a perforated frusto-conically shaped casing secured on the upper portion thereof, a similarly shaped screen adjacently secured therein, with an outer cylindrically shaped casing, an open annular diaphragm therein, and inverted V shaped partitions superimposed on the bottom of said outer casing with openings therebetween and chutes depending from said bottom over said openings, as and for the purposes described.

In testimony whereof I have affixed my signature in presence of two witnesses.

AUGUST MAASSEN.

Witnesses:
 Max W. Kunkely,
 D. M. Kunkely.